United States Patent
De Groot-Barrere et al.

(10) Patent No.: US 12,502,458 B2
(45) Date of Patent: Dec. 23, 2025

(54) ANHYDROUS BIOCOMPATIBLE COMPOSITE MATERIALS

(71) Applicant: Kuros Biosciences B.V., Bilthoven (NL)

(72) Inventors: Florence De Groot-Barrere, Bilthoven (NL); Davide Barbieri, Bilthoven (NL); Dirk Wybe Grijpma, Bilthoven (NL); Joost De Bruijn, Bilthoven (NL)

(73) Assignee: Kuros Biosciences B.V., Bilthoven (NL)

( * ) Notice: Subject to any disclaimer, the term of this patent is extended or adjusted under 35 U.S.C. 154(b) by 0 days.

(21) Appl. No.: 15/550,351

(22) PCT Filed: Mar. 14, 2016

(86) PCT No.: PCT/NL2016/050182
§ 371 (c)(1),
(2) Date: Aug. 10, 2017

(87) PCT Pub. No.: WO2016/144182
PCT Pub. Date: Sep. 15, 2016

(65) Prior Publication Data
US 2018/0028720 A1 Feb. 1, 2018

(30) Foreign Application Priority Data
Mar. 12, 2015 (NL) .................... 2014446

(51) Int. Cl.
| | | |
|---|---|---|
| *A61L 27/26* | (2006.01) | |
| *A61L 27/46* | (2006.01) | |
| *A61L 27/50* | (2006.01) | |
| *A61L 27/58* | (2006.01) | |
| *C08G 81/02* | (2006.01) | |
| *C08K 5/04* | (2006.01) | |

(52) U.S. Cl.
CPC .............. *A61L 27/26* (2013.01); *A61L 27/46* (2013.01); *A61L 27/50* (2013.01); *A61L 27/58* (2013.01); *C08G 81/027* (2013.01); *C08G 81/028* (2013.01); *C08K 5/04* (2013.01); *A61L 2430/02* (2013.01)

(58) Field of Classification Search
CPC ...... A61L 27/46; A61L 2430/02; A61L 27/58; C08G 81/027; C08G 81/028
See application file for complete search history.

(56) References Cited

U.S. PATENT DOCUMENTS

| | | | | |
|---|---|---|---|---|
| 5,702,717 | A * | 12/1997 | Cha ........................ | C08G 81/00 424/501 |
| 2013/0125786 | A1* | 5/2013 | Vogt ........................ | A61L 2/18 106/287.2 |
| 2014/0088618 | A1* | 3/2014 | Song ....................... | A61L 27/46 606/151 |
| 2017/0224883 | A1* | 8/2017 | Coudane ................. | A61L 31/148 |

FOREIGN PATENT DOCUMENTS

| | | |
|---|---|---|
| CN | 103491946 A | 1/2014 |
| EP | 0 714 666 | 6/1996 |
| JP | H02-78629 A | 3/1990 |
| JP | 2003517886 A * | 6/2003 |
| JP | 2007-513252 | 5/2007 |
| JP | 2011-520557 | 7/2011 |
| WO | WO-2005/056070 | 6/2005 |
| WO | WO-2006/014607 | 2/2006 |
| WO | WO-2009/142934 | 11/2009 |
| WO | WO-2011/009635 | 1/2011 |
| WO | 2012090070 A2 | 7/2012 |

OTHER PUBLICATIONS

Kissel et al., Advanced Drug Delivery Reviews, 54, 2002, 99-134 (Year: 2002).*
Shi et al., Advanced MAterials Research, 2006, 11/12, 469-472 (Year: 2006).*
Google Definition: Putty, 1 page.*
Cross, Am. J. Physics, 2012, 80, 870-875.*
Putty: Deformation Demonstration 2 pgs, 1999.*
ResearchGate:PLA, 1 pg, https://www.researchgate.net/figure/Structural-formula-of-Poly-lactic-acid-Structural-formula-of-Poly-lactic-acid_fig2_281376881.*
SigmaAldrich:PEG , 1 pg, https://www.researchgate.net/figure/Structural-formula-of-Poly-lactic-acid-Structural-formula-of-Poly-lactic-acid_fig2_281376881.*
Fluidinova:hydroxyapatite, 1 pg, https://www.fluidinova.com/hydroxyapatite-properties-uses-and-applications.*
Sawhney et al., Macromolecules, 25, 1993, 581-587.*
ResearchGate:PLA, 2022, 1 pg, https://www.researchgate.net/figure/Structural-formula-of-Poly-lactic-acid-Structural-formula-of-Poly-lactic-acid_fig2_281376881 (previously cited Mar. 25, 2022).*
SigmaAldrich:PEG , 2022, 1 pg, https://www.researchgate.net/figure/Structural-formula-of-Poly-lactic-acid-Structural-formula-of-Poly-lactic-acid_fig2_281376881 (previously cited Mar. 25, 2022).*
Fluidinova:hydroxyapatite, 2022, 1 pg, https://www.fluidinova.com/hydroxyapatite-properties-uses-and-applications (previously cited Mar. 25, 2022).*
Google Definition: Putty, 1 page, 2020 (previously cited Oct. 28, 2020).*

(Continued)

*Primary Examiner* — Kyle A Purdy

(74) *Attorney, Agent, or Firm* — Banner & Witcoff, Ltd.

(57) ABSTRACT

The invention is directed to biocompatible composite materials for medical applications such as tissue regeneration. In particular, the present invention is directed to biocompatible composite materials that may be used for the treatment of lost bone or bone defects. According to the invention there is provided an anhydrous biocompatible composite material comprising a biodegradable polymeric material and a granular synthetic material, wherein the polymeric material essentially consists of at least one block copolymer that comprises at least one hydrophilic block and at least one hydrophobic block.

23 Claims, 9 Drawing Sheets

(56) References Cited

OTHER PUBLICATIONS

Database Medline, accession No. NLM8358939 (Sep. 1993), 1 page.
Garric et al., "Potential of a PLA-PEO-PLA-Based Scaffold for Skin Tissue Engineering: In Vitro Evaluation", Journal of Biomaterials Science (2012) 23:1687-1700.
Hoshino et al., "Repair of bone defects in revision hip arthroplasty by implantation of a new bone-inducing material comprised of recombinant human BMP-2, Beta-TCP powder, and a biodegradable polymer: an experimental study in dogs", Journal of Orthopaedic Research (2007) 25(8):1042-1051.
International Search Report for PCT/NL2016/050182, mailed Jul. 6, 2016, 5 pages.
Kato et al., "Ectopic bone formation in mice associated with a lactic acid/dioxanone/ethylene glycol copolymer-tricalcium phosphate composite with added recombinant human bone morphogenetic protein-2", Biomaterials (2006) 27:3927-3933.
Saito and Takaoka, "New synthetic biodegradable polymers as BMP carriers for bone tissue engineering", Biomaterials (2003) 24:2287-2293.
Saito et al., "A biodegradable polymer as a cytokine delivery system for inducing bone formation", Nature Biotechnology (2001) 19:332-335.
Wikipedia—Granular Material https://en.wikipedia.org/wiki/Granular_material.
Fluidinova: hydroxyapatite, 4 pgs, https://www.fluidinova.com/hydroxyapatite-properties-uses-and-applications.
Shi et al. "Synthesis, characterization, and application of reversible PDLLA-PEG-PDLLA copolymer thermogels in vitro and in vivo" Scientific Reports | 6:19077 | DOI: 10.1038/srep 19077.
Kutikov et al. "Rapid Prototyping Amphiphilic Polymer/Hydroxyapatite Composite Scaffolds with Hydration-Induced Self-Fixation Behavior" Tissue Engineering: Part C vol. 21, No. 3, 2015.
Cerrai et al. "Block copolymers of L-lactide and poly(ethylene glycol) for biomedical applications" Journal of Materials Science: Materials in Medicine 5 (1994) 308-313.
Teixeira et al. "Physical characterization of hydroxyapatite porous scaffolds for tissue engineering" Materials Science and Engineering C 29 (2009) 1510-1514.
Lee et al. "Thermoresponsive Phase Transitions of PLA-block-PEO-block-PLA Triblock Stereo-Copolymers in Aqueous Solution" Macromolecular Research, vol. 10, No. 6, pp. 359-364 (2002).

* cited by examiner

ANHYDROUS BIOCOMPATIBLE COMPOSITE MATERIALS

CROSS-REFERENCE TO RELATED APPLICATIONS

This application is the national phase of PCT application PCT/NL2016/050182 having an international filing date of 14 Mar. 2016, which claims benefit of Dutch patent application No. 2014446 filed 12 Mar. 2015. The contents of the above patent applications are incorporated by reference herein in their entirety.

TECHNICAL FIELD

The invention is directed to biocompatible composite materials for medical applications such as tissue regeneration. In particular, the present invention is directed to biocompatible composite materials that may be used for the treatment of lost bone or bone defects.

DESCRIPTION OF THE RELATED ART

Methods for tissue regeneration mostly rely on autograft and allograft donor tissues, i.e. natural donor tissues. In bone regeneration methods based on autograft, bone from the patient itself is placed at the site of bone loss or defect. Disadvantages of this technique are significant donor-site morbidity and/or pain at the removal site of the replacement bone. Moreover, the amount of available autograft bone is limited. Biological alternatives to autografts include allograft (bone taken from a donor subject or animal, i.e. xenograft), demineralized bone matrix (DBM), growth factors (e.g. bone morphogenetic proteins, BMP), or cell-based products. Drawbacks of the bone derived methods are the risk of disease transfer and/or immune response and the high costs of using DBM and BMP.

Alternative methods have emerged to replace the above-mentioned methods that rely on natural bone grafts. These alternative methods typically make use of granular synthetic materials (e.g. bioglass, ceramics, polymers) for instance comprise calcium phosphate (CaP) ceramics. These granular synthetic materials are generally bioactive. This means that they support the newly formed tissue by providing a supporting and guiding framework, comprise and provide essential material feed for the new tissue and/or even stimulate the formation of new tissue. In the field of bone repair, this bioactivity is also referred to as osteoconduction and, in specific cases, osteoinduction.

The granular synthetic material being osteoconductive means that newly formed bone will be guided by the granular synthetic material that acts as a scaffold for bone growth. For osteoconduction to occur, osteoblasts use the synthetic material as a framework to grow and form new bone.

The granular synthetic material being osteoinductive means that the granular synthetic material stimulates new bone formation, even at places where there is no native bone present to provide the osteoblasts. Osteoinduction involves the differentiation of osteoprogenitor cells into osteoblasts. These osteoblast may then form new bone by using the granular synthetic material as a framework for bone growth as explained above.

For the application of these granular synthetic materials it is important that they are positioned at the site of the bone loss or defect and remain in place for the bone to grow into the granular synthetic material. This is typically achieved by using a polymeric material as a carrier of the granular synthetic material. Carriers are also called binders. In order to retain the reconstruction properties of the granular synthetic material, it is important that the polymeric material is rapidly degraded at the site of application. Therefore, the polymeric material is preferably a biodegradable polymeric material.

It is generally accepted that the bone reconstruction properties of the granular synthetic material probably originate from the micro- and submicro-structure of the surface of the synthetic material. It is known that certain CaP comprising granular synthetic materials with specific micro- and sub-microsurface structures also have osteoinductive properties. It is further known that prolonged aqueous conditions may affect the micro- and submicro-structure of the surface of the material and the reconstruction properties of the granular synthetic materials may be lost. Hence, for the reconstructive properties of the granular synthetic material is important that its surface structure remains intact during e.g. storage of the material. It is therefore preferred that the composition of granular synthetic material and biodegradable polymeric material is anhydrous. When the biodegradable polymeric material is anhydrous, a composition of the biodegradable polymeric material and the granular synthetic material may be stored together for longer periods without losing the effectiveness of the granular synthetic material.

EP-A-0714666 describes a composition of synthetic material and a polymeric carrier wherein the polymeric carrier is a copolymer (i.e. a polymer based on more than one type of monomer) from the monomers ε-caprolactone and glycolide. Drawbacks of these copolymers are that these do not show the desired rate of degradation. The carrier is therefore less suitable for e.g. osteoinduction. Moreover, these types of polymers may only be sterilized by methods other than gamma- or electron-beam irradiation because the copolymers degrade upon irradiation rendering the copolymer material unsuitable as a carrier. This becomes evident from i.a. EP-A-0050215 wherein similar copolymers are in fact willingly degraded by irradiation.

WO 2011/009635 describes a composition of synthetic material and a carrier that comprises a biodegradable homopolymer (i.e. a polymer based on one type of monomer) such as polyoxamer and polysaccharides. However, also these homopolymers do withstand not irradiative sterilization conditions. It is known for e.g. polyethylene glycol that irradiation with gamma-rays results in cross-linking of the polymers, thereby affecting the properties of the material rendering it unsuitable to act as a carrier. Furthermore, it is known that polysaccharides such as carboxy methylcellulose are oxidized by irradiation, also resulting in modified material properties.

Kato et al. Biomaterials 27 (2006) 3927-3999 discloses a putty of a block copolymer of poly(lactic acid) (PLA) with randomly inserted p-dioxanone (DX) and poly(ethylene glycol) (PEG) in combination with beta-tricalcium phosphate (ß-TCP) powder and rhBMP-2. A drawback of these composite materials is however that this block copolymer is known to retain >90% of their original mass until day 10 (see e.g. Saito et al. Nature Biotechnology 19 (2001) 332-335).

Hoshino et al. Journal Orthopaedic Research (2770) 1042-1051 discloses a putty of a block copolymer of PLA and PEG with ß-TCP and rhBMP-2. However, the used block copolymer do not have the desired rate of biodegradation and have less favorable handling characteristics.

It is desirable to have a biodegradable polymeric material that acts as a carrier of granular synthetic material under anhydrous conditions, is resistant to gamma-radiation and shows the desired mechanical properties and rate of biodegradation.

SUMMARY

The present inventors have surprisingly found a biodegradable polymeric material that meets these requirements.

DETAILED DESCRIPTION

Figure 1:
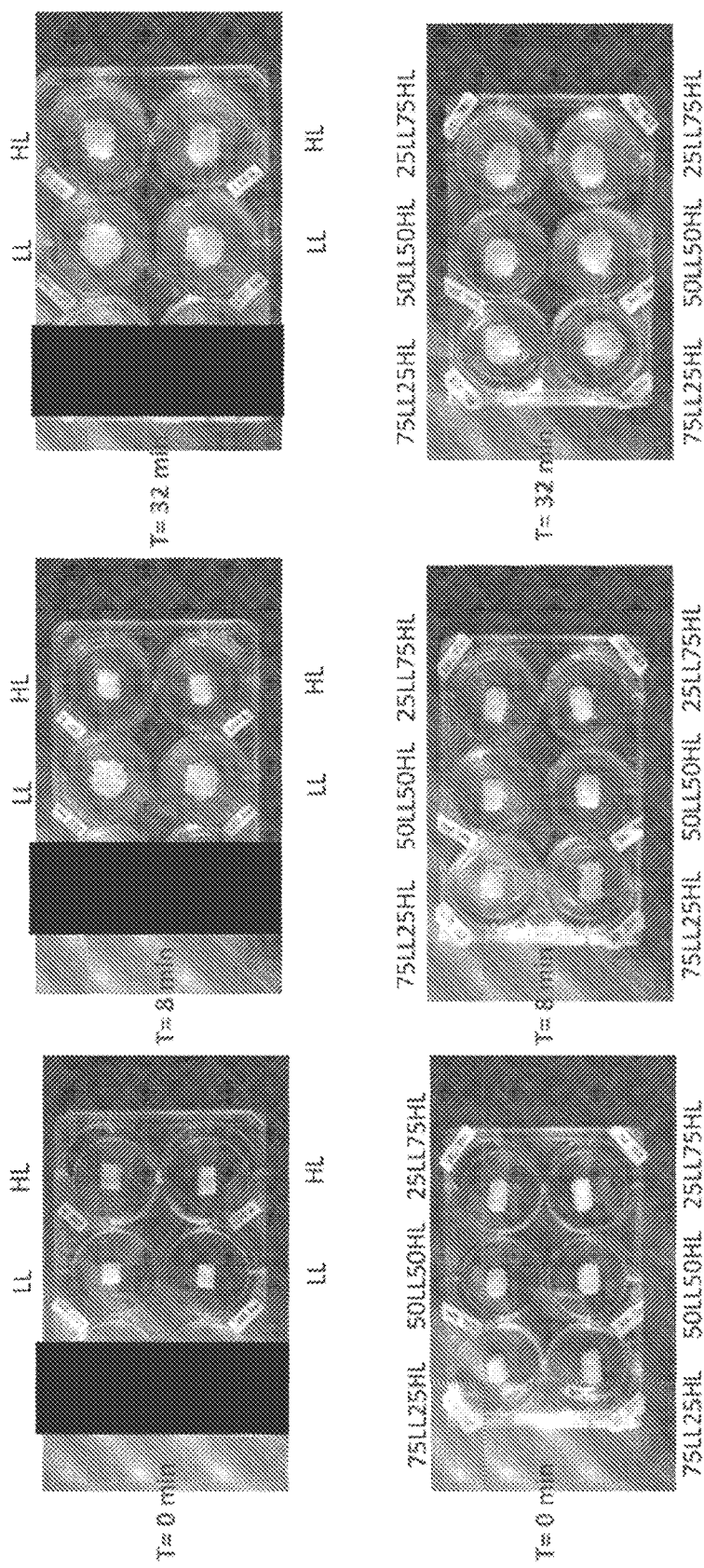
FIGS. 1 and 2 show images of dissolution of various of the block copolymer blends over time as carried out in Example 3.

The present invention is an anhydrous biocompatible composite material comprising a biodegradable polymeric material and a granular synthetic material, wherein the polymeric material essentially consists of at least one block copolymer, wherein at least one block copolymer is a polymer according to formula (I)

(I)

wherein;
A and B are independently methylene oxide, ethylene oxide, propylene oxide, butylene oxide, dioxanone or phenyl oxide, preferably ethylene oxide or propylene oxide;
X is a polyamide, polyester, polyurethane, polycarbonate or polyester unit, preferably a polyester unit, more preferably hydroxybutyrate, lactic acid, glycolide, γ-butyrolactone, δ-valerolactone or ε-caprolactone, most preferably lactic acid;
l is 0 or 1, preferably 0;
m is 1 to 25;
n is m or 0;
p is 2 to 150;
q is 0 to 100; and
l+n is more than 0.

In the representation of formula (I), $A_p$ and $B_q$ are hydrophilic blocks and $X_n$ and $X_m$ are hydrophobic blocks. The block copolymer of the present invention thus comprises at least one hydrophilic block and at least one hydrophobic block.

The term essentially consisting means that the polymeric material typically consists of at least 90 wt %, more preferably at least 95 wt %, most preferably at least 99 wt % of one or more of said block copolymers.

For sake of conciseness, the anhydrous biocompatible composite material is herein also referred to as composite material. The granular synthetic material is herein also referred to as granules.

Granular Synthetic Material

The anhydrous biocompatible composite material in accordance with the present invention is applicable as a medicament in for instance the field of tissue repair. The composite material may in particularly be applied for the treatment of connective tissue and/or bone loss or defects.

Preferably, the granular synthetic material is osteoconductive. The inventors surprisingly found that the polymeric material is particularly suitable to be combined with osteoconductive granular synthetic material because the polymeric material does, i.a. due to is biodegradation properties, not inhibit bone regeneration and osteoinduction.

In a further preferred embodiment, the anhydrous biocompatible composite material is osteoinductive. This means that the anhydrous biocompatible composite material comprises one or more material that are osteoinductive. Osteoinductive properties of the anhydrous biocompatible composite material may for instance be achieved by addition of bone morphogenetic proteins (BMP) and/or other growth factors. In an even further preferred embodiment, the granular synthetic material is intrinsically osteoinductive. This means that the granular synthetic material itself stimulates the formation of osteoblast and thus formation of new bone even in non osseous environments (e.g. osteoinductive ceramics, demineralized bone matrix-DBM).

WO 2015/009154, which is incorporated herein in its entirety, describes granular synthetic materials based on calcium phosphate CaP that are osteoinductive. It was found that in particular the biodegradable polymeric material of the present invention is suitable to maintain the osteoinductive properties of the granular synthetic materials as described in WO 2015/009154.

The granular synthetic material in accordance with the present invention may comprise calcium phosphate, bioactive glass and the like. Rahaman et al. *Acta Biomateralia* 2011(6)2355-2373 reviews a variety of synthetic materials for tissue-engineering that are suitable for the present invention. The granular synthetic materials may be granular ceramic material. Preferably, the granular synthetic material comprises calcium phosphate. Such granular synthetic materials have proven to be particularly suitable for tissue regeneration.

The osteoinductive properties of certain granular synthetic materials are commonly attributed to their specific micro- and sub-microsurface structure. Water may affect this structure and thereby affect the osteoinductive properties of the granular synthetic material. Also other properties of the granular synthetic material may be affected by the presence of water because the synthetic materials may be for instance partially dissolved by the water. Moreover, it is known that water may also affect the osteoinductive potential of other agents, i.e. BMPs and DBM. Therefore, the biocompatible composite material is anhydrous in order to prevent or limit reduction of e.g. the osteoconductive and osteoinductive properties. Anhydrous in the present invention therefore means that the environment granular synthetic material is sufficiently anhydrous for the granular synthetic material to sufficiently retain the chemical and structural properties to limit reduction of the biological activity of the granular synthetic material such that the biocompatible composite material remains effective and thus applicable. This is in contrast to for instance hydrogels which can also be formed with the polymeric material of the present invention.

Biodegradable Polymeric Material

The biodegradable polymeric material in accordance with the present invention degrades under physiological conditions in preferably less than 48 hours. From Davison N. L. et al. (Acta Biomaterialia, 2012 July; 8(7): 2759-2769) and Barbieri D, et al. (Acta Biomaterialia, 2011 May; 7(5): 2007-2014) it is known that the osteoinductive properties of the granular synthetic material are not lost if the biodegradable polymeric material degrades within 48 hours. Also for osteoconduction it is preferred that the polymeric material degrades within 48 hours. For the composite material, the biodegradable polymeric material typically fills up the voids between the granular synthetic material and the voids within the granules that are the result of the micro- and submicrostructure of the material. For the purpose of bone regeneration, it is essential that e.g. the osteoblast and osteoprogenitor cells, but also blood cells and other cell that are required for bone regeneration can penetrate said voids to form the new bone structure. If the degradation occurs within one hour, there may not be sufficient time to apply the anhydrous biocompatible composite material at the site of treatment which is typically a wet environment. Therefore, more preferably, polymeric material is degraded in more than 10 minutes, most preferably in a time between ¼ hour and 48 hours.

Biodegradation of the polymeric material means that the polymeric material is degraded, disintegrated, resorbed and/or dissolved at the site of application in such a way that it will not prevent the effectiveness of the granular synthetic material. The precise mechanism of biodegradation, e.g. whether bacteria, cells and/or enzymes are involved or not, is irrelevant. The biodegradation may for instance simply occur in only the presence of water. The time required for the degradation may be determined by a test wherein the composite material in accordance with the present invention is immersed in a phosphate-buffered saline (PBS) or another equivalent isotonic solution at a temperature of about 37° C. without shaking. The biodegradation of the composite material may be monitored by visual inspection.

The anhydrous biocompatible composite material according to the present invention is preferably an injectable, malleable and/or kneadable non-sticky putty that retains its shape at a typical temperature of 15 to 40° C. Such a putty is particularly advantageous when the composite material is used for bone repair. The physical properties of the composite material may be determined by subjecting the composite material in a blind test, that may involve a scoring of the composite material according to the parameters set out in Table 1. The blind test is typically carried out by three or more skilled persons and for each person the Final Score (FS) is calculated as FS=M+R+H+S+O+RG. Preferably, the Final Score is higher than 15, more preferably higher than 20, most preferably higher than 22. When more than one person carried out the test, the average of all Final Scores is calculated and used to evaluate the putty. Hence, it will be appreciated that when more than one skilled person carried out the blind test, the Final Score in an average of all Final Scores.

TABLE 1

Scoring for blind test of injectable, malleable and/or kneadable non-sticky putties

| Parameter | Score description |
|---|---|
| Mouldability (M): is the composite material easily malleable, i.e. can it be given any shape? Scale 1-5 | 1 impossible to shape it; 2 hard to shape (for any reason); 3 shapeable, but can be softer; 4 shapeable, good; 5 excellent. |
| Recovery (R): after shaping and spreading it onto a surface, can it be completely recovered easily? Scale 1-5 | 1 impossible to recover it without losses; 2 recover with lot of losses; 3 recover with minimal losses; 4 recover completely, but sticky; 5 recover completely with no problem. |
| Hardness (H): is the composite material soft, hard or a balance in between? Scale 1-5 | 1 a stone or completely loose; 2 little deformable, but either very hard or very soft; 3 deformable, with some difficulties (e.g. a bit sticky); 4 deformable, good; 5 excellent. |
| Stickiness (S): is the composite material sticky onto the gloves? Scale 1-5 | 1 completely sticky; 2 sticky, moldable with some difficulty; 3 sticky, with good moldability; 4 not sticky, good; 5 excellent. |
| Oiliness (O): during the shaping, are the gloves getting oily? Scale 1-5 | 1 gloves are oily but sticky; 2 gloves are oily but not sticky; 3 oily, but not excessively; 4 minimally oily; 5 not oily at all, dry gloves. |
| Retaining granules (RG): during the shaping, are the granules retained in the putty? Scale 1-5 | 1 completely loose before shaping; 2 all granules are dispersed during shaping; 3 lot of granules are lost during shaping; 4 a few granules are lost during shaping; 5 no granule loss |

In another embodiment of the present invention, the composite material may be used to treat connective tissue such as skin. Upon aging of connective tissue, it typically starts to show pronounced sagging, wrinkles and/or fine lines. The anhydrous biocompatible composite material of the present application may be a dermal filler that may be used to treat or prevent signs of aging of the connective tissue. The physical properties of the dermal filler may be the same or different compared to the injectable, malleable and/or kneadable non-sticky putty. Besides the biodegradable polymeric, the dermal filler may further comprise other components typically used in the treatment of connective tissue. Examples of these are collagen, hyaluronic acid fillers and other components found in known dermal fillers such as Restylane®, Sculptra® and Rediesse® (M. H. Gold, Clin. Interv. Aging 2007 September; 2(3): 369-376).

It was surprisingly found that the biodegradable polymeric material that essentially consists of one or more block copolymer comprising at least one hydrophilic block and at least one hydrophobic block is particularly resistant to γ-radiation and electron beam radiation for sterilization purposes. This i.a. means that the handling properties of the composite material (as e.g. determined by the blind test of Table 1) were not significantly changed after irradiation. This is in strong contrast with other polymeric materials that are not based on block copolymers, for instance those disclosed in WO 2011/009635. It is known that poly(ethylene glycol) (PEG) cross-links upon γ-irradiation while for instance polylactide (PLA) and carboxymethyl cellulose (CMC) disintegrates upon γ-irradiation. Blends of PEG and PLA are also not stable links upon γ-irradiation. Cross-linking and disintegration typically results in unacceptable changes of physical properties, e.g. brittleness (e.g. for PLA-based or PEG-based homopolymers), softening or even liquefaction of the material (e.g. for CMC-based homopolymers). Surprisingly, a block copolymer of both polymers is able to resist sterilization by γ-irradiation and/or electron beam irradiation. This is particularly advantageous for anhydrous composite materials since the alternative sterilization method is steam treatment. Steam treatment for sterilization of the composite materials in accordance with the present application is not preferred because the polymeric material may (partially) degrade by the steam. Moreover, the granular synthetic material can not withstand steam because their particular structure will disintegrate leading to loss of the bioactivity as explained herein above. The granular synthetic material would thus need to undergo a separate sterilization procedure.

A further aspect of the present invention is a method for sterilization of a biodegradable polymeric material that essentially consists of one or more block copolymer comprising at least one hydrophilic block and at least one hydrophobic block, wherein the biodegradable polymeric material is irradiated by γ-rays and/or electron beams using standard doses for medical devices, i.e. 10-50 kGy for γ-rays and/or electron beams, more preferably 25-45 kGy.

In another embodiment, the anhydrous composite material as a whole is sterilized by irradiation by γ-rays and/or electron beams.

The hydrophilic block in accordance with the present invention typically comprises a polyether, preferably a polyoxymethylene, poly(ethylene glycol), poly(propylene glycol), polytetrahydrofuran, polydioxanone, polyphenyl ether, a poloxamer or combinations thereof. More preferably, the hydrophilic block comprises poly(ethylene glycol) or a poloxamer.

When a block is said to be hydrophilic, this means that the block may be soluble in water such that it may be cleared from the site of application by dissolution. When the hydrophilic block comprises e.g. poly(propylene glycol), polytetrahydrofuran, polydioxanone and/or polyphenyl ether, the hydrophilic block typically also comprises polyoxymethylene and/or poly(ethylene glycol) to make the block hydrophilic, i.e. soluble in water. A poloxamer (i.e. a polyether comprising poly(ethylene glycol) and poly(propylene glycol) is an example of such an embodiment. By using standard experimental techniques, the person skilled in the art may readily determine whether the hydrophilic block is soluble in water in accordance with the present invention.

The hydrophobic block in accordance with the present invention typically comprises a polyamide, polyester, polyurethane, polycarbonate or combinations thereof, preferably polyglycolide or polylactide.

The present inventors found that short hydrophobic blocks result in better physical properties of the polymeric material. Examples of such increase physical properties are higher melting points (typically more than 40° C.), which is beneficial for storage purposes, combined with waxy, moldable, tacky characteristic as well as a biodegradability of more than 15 minutes and less than 48 hours.

Particularly good results were obtained for a preferred embodiment, wherein the block copolymer in accordance with the present invention may be a polymer represented by formula (I) as described above, wherein m is 2 to 10, preferably 3 to 7; p is 6 to 100, preferably 40 to 50; and/or q is 0 to 50, preferably 0 to 19.

From formula (I) it may be appreciated that the block copolymer's termini may be hydrophilic blocks (i.e. l is 1 and n is 0) or hydrophobic blocks (i.e. l is 0 and n is m). Preferably, the polymer termini are hydrophobic. In such an embodiment is the block copolymer typically obtained by providing a hydrophilic polymer $B_q\text{-}A_p\text{-}B_q$ which is then reacted in a polymerization reaction with monomers that form the hydrophobic blocks $X_n$ and $X_m$. In case of a cyclic ester, this reaction is typically a ring-opening polymerization reaction. The polyethers poly(ethylene glycol) and poly(propylene glycol) are typical made out of the monomers ethylene oxide (EO) and propylene oxide (PO) respectively. In the context of the present invention, polymers based on ethylene oxide and/or propylene oxide are the same as polymers based on ethylene glycol and/or propylene glycol, respectively.

For sake of clarity and conciseness the A, B and X are herein defined by and named after the monomer from which the blocks are made of.

In case lactide is used, any isomer (i.e. L-lactide, D-lactide and meso-lactide) may be used. Preferably, the lactide is substantially one isomer, more preferably substantially D- or L-lactide and most preferably substantially L-lactide. Substantially means here that the block typically consists of more than 90 wt %, preferably more than 95 wt %, even more preferably more than 99 wt % of the isomer used.

In a specific embodiment wherein $A_p$ is poly(propylene glycol) and $B_q$ is poly(ethylene glycol), the synthesis of the block copolymer may be initiated by polyoxamers that are commercially available. The polyoxamers that known as Pluronics® may in particular be used. A large variety of Pluronic® type polymers such as e.g. P65, F127, are commercially available. Pluronic® P65 may for instance be represented by the formula $EO_{11}PO_{16}EO_{11}$, while Pluronic® F127 is $EO_{100}PO_{65}EO_{100}$.

As is typically the case in polymer chemistry, the number of monomer units given is an average number of the number of monomers based on the amount of monomers the synthesis of the polymer was performed with. The polydispersity index (PDI) is typically used as a measure of the distribution of molecular mass (and thus also a measure of the distribution of the number of monomers) in a given polymer sample.

It has been found that certain properties, in particular the handling properties according to the blind test of Table 1 and the biodegradation properties can be influenced by the molar ratio of monomers contained in the hydrophobic block(s) and monomers contained in the hydrophilic block(s). In case the block copolymer may be represented by formula I, this ratio may theoretically be calculated by dividing (n+m) over (p+q). If the parameters n, m, p and q are determined by the amount of material with which the polymerization reaction was started, a theoretical ratio is calculated. When the parameters n, m, p and q are empirically determined by e.g. $^1$H NMR spectroscopy, an actual ratio may be calculated.

Figure 11:
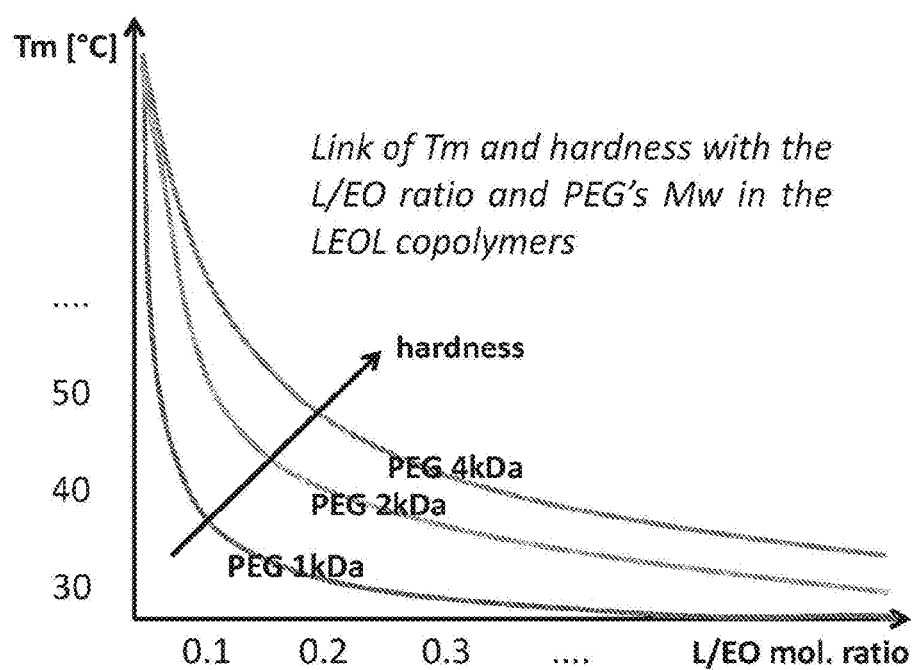
FIG. 11 shows the relationship between the lactic acid units (hydrophobic block) over ethylene oxide units (hydrophilic block)) ratio, the melting point (Tm), the PEG length and the hardness of compositions.

In FIG. 11, the relationship between the actual ratio L/EO (i.e. the ratio lactic acid monomers (hydrophobic block) over ethylene oxide monomers (hydrophilic block)), the melting point range (Tm), PEG length and hardness of the putty is depicted. This figure shows that the actual ratio influences the physical properties of the putty.

It has been found that, in particular when q is 0 and A is ethylene oxide, the actual ratio is preferably less than 0.36, preferably less than 0.30, more preferably between 0.01 and 0.25, even more preferably between 0.05 and 0.15, even more preferable between 0.08 and 0.12, most preferably about 0.10. It will be appreciated that for block copolymers that may not be represented by formula I, but do fall within the scope of the present invention, the molar ratio's (both the theoretic and actual ratio's) may be calculated in an analogues manner.

Lactide and lactic acid are herein used interchangeable to describe the monomers or building blocks of the polylactide or poly(lactice acid) blocks since these blocks are structurally the same. However, only the lactic acid monomer is used for calculating the ratio of monomers (e.g. L/EO) or the number of monomers (e.g. $X_n$ and $X_m$ in formula I) present in a block and/or copolymer.

In a further embodiment of the present invention, the biodegradable polymeric materials comprises two or more block copolymers, each comprising at least one hydrophilic block and at least one hydrophobic block. Hence, a blend of block copolymers may be used. When a blend of block copolymers are used, it is meant that two or more different type of block copolymers according to the present invention are used. These block copolymers may differ in mass, molar ratio of monomers and/or type of monomers and so forth.

By using a blend of block copolymers, it is possible to accurately optimize the desired properties of the biodegradable polymeric material, without much synthetic effort. It was found that also when a blend of block copolymers was used, the total molar ratio of monomers contained in the hydrophobic blocks and monomers contained in the hydrophilic blocks may be used to influence the properties of the biodegradable polymeric material. In this case, the total molar ratio may be calculated by using the actual ratio's of the individual block copolymers as determined by $^1$H NMR.

A biodegradable polymeric material that essentially consists of a blend of two or more block copolymers, in particular a blend of two block copolymers, is preferred. This is particular the case when the polymer termini are hydrophilic and/or the hydrophilic block consists of poly(ethylene glycol). For instance, for polymers according to formula (I) wherein m is n; l and q are 0, it is preferred to use a blend of two block copolymers.

In another embodiment of the present invention, the anhydrous biodegradable composite material further comprises one or more drugs, e.g. an anti-biotic, an anti-inflammatory agent and the like. Such drugs may be beneficial for the tissue-regeneration treatment. The drug may be incorporated together with the granular synthetic material in the polymer material. Once, the polymer material degrades, the drugs are released.

The composite material in accordance with the present invention is particularly suitable for osteoinduction. Hence, a further aspect of the present invention is a method to treat bone loss or defect, by shaping the anhydrous biocompatible composite material according to the present invention in a desired shape and placing it at the site of bone loss or defect.

For the purpose of clarity and a concise description features are described herein as part of the same or separate embodiments, however, it will be appreciated that the scope of the invention may include embodiments having combinations of all or some of the features described.

The invention may be illustrated by the following examples and experimental results.

Example 1

In this example, the synthesis and characterization of a particular polymeric material in accordance with the present invention will be described.

1.1. Synthesis of Poly(L-Lactide)-Co-Poly(Ethylene Oxide)-Co-Poly(L-Lactide) Triblock Block Copolymers (i.e. LEOL)

The LEOL block copolymers were synthesized via ring-open polymerization of L-lactide monomer in presence of poly(ethylene oxide) as initiator and stannous octoate ($SnOct_2$) as catalyst. All reactions were performed in argon saturated atmosphere. Poly(ethylene oxide) (EO) and L-lactide monomer were blended in a glass three-necked flask and gradually warmed to 130° C. under gentle stirring under an argon atmosphere. Afterwards, 4-5 drops (ca. 160-170 µL) of the catalyst were added and the mixture was let reacting at the temperature of 130° C. and stirring rate of 50 rpm for 24 hours. Table 2 shows the synthesized block copolymers.

TABLE 2

Poly(ethylene glycol)-based block copolymers (LEOL)* block ratio's used during the synthesis.

| Copolymer ID | Theoretical block composition | Theoretical L/EO mol. ratio |
|---|---|---|
| LL | $L_{2.5}EO_{23}L_{2.5}$ | 0.22 |
| ML | $L_5EO_{46}L_5$ | |
| HL | $L_{10}EO_{91}L_{10}$ | |
| HM | $L_{15}EO_{91}L_{15}$ | 0.33 |
| LH | $L_5EO_{23}L_5$ | 0.44 |
| MH | $L_{10}EO_{46}L_{10}$ | |
| HH | $L_{20}EO_{91}L_{20}$ | |

*the XY nomenclature is used. The letter X indicates the EO block length (e.g. L = $EO_{23}$; M = $EO_{46}$; H = $EO_{91}$) and Y indicates the L-lactic acid/EO block mol. ratio (e.g. L = 0.22; M = 0.33; H = 0.44). Wherein the theoretical L/EO molar ratio is the theoretical ratio as described herein above for the lactic acid monomers over the ethylene oxide monomers.

1.2. Characterization of Poly(Ethylene Glycol)-Based Block Copolymers (LEOL)

1.2.1. Physical (Gross) Appearance

The block copolymers were analyzed by a stereomicroscope to detect any undesired inhomogeneity. Afterwards the block copolymers were characterized for their hardness first via pressing with steel tools and subsequent shaping by hands. Table 3 summarizes the observations.

TABLE 3

Physical observations (handling) on poly(ethylene glycol)-based block copolymers (LEOL).

| ID | Observations |
|---|---|
| LL | White soft mass that melts as soon as kept in hands leaving a sticky layer of polymer. |
| ML | Transparent thick but malleable mass. Does not melt as fast as LL in hands: there is need to process it to get it spread on skin leaving a sticky layer of polymer. |
| HL | Hard and waxy. Resists better when worked in hands and gets softer leaving an oily effect. |
| HM | Very similar to HL. Additional lactide (compared to HL) is expected to enhance handling and increase hydrophobicity. |
| LH | Extremely soft gel, which immediately gets liquid once touched with hands. |
| MH | Harder than ML (i.e. need to scratch) but gets melted quicker when worked in hands. |
| HH | Very hard and waxy. Similar to HL. |

Based on these observations, a trend seems to exist wherein a shorter EO block results in a the softer mass (e.g. LL vs. ML vs. HL).

1.2.2. Melting Point: Visual Estimation

A volume of roughly one mL of each block copolymer was put in glass vials immersed in cold water bath, which was warmed via a gentle temperature ramp. The temperature of the block copolymer was continuously monitored and the melting point range was recorded: the lowest temperature was the one at which the polymer visually started to change state while the highest temperature was taken when the polymer was completely melt. Table 4 shows the results.

TABLE 4

Melting range of poly(ethylene glycol)-based block copolymers (LEOL).

| Copolymer ID | Melting point range [° C.] | Appearance after melting |
|---|---|---|
| LL | 30-35 | Clear liquid |
| ML | 45-50 | Clear liquid |
| HL | 55-60 | Clear liquid |
| HM | 40-60 | Clear liquid |
| LH | <30 | Clear liquid |
| MH | <40 | Clear liquid |
| HH | <40 | Clear liquid |

The results show that LEOL block copolymers have increasing melting temperature ranges with the increase of EO block size, but it decreases when lactide block size increased. Therefore, a few conclusions may be drawn:
1) the shorter EO block, the lower the melting point (e.g. LL vs. ML vs. HL);
2) the longer L-lactide block, the lower melting point (e.g. LL vs. LH and ML vs. MH).

1.2.3. Composition: $^1$H-NMR

Copolymers were dissolved in deuterated chloroform (i.e. $CDCl_3$, at any concentration) and spectra (NMR-spectra 1, vide infra) were obtained via proton nuclear magnetic resonance ($^1$H-NMR, 400 MHz) to determine the molecular composition of each copolymer. Peak integration was performed on raw spectra (i.e. without any processing) and the total area of EO block peak ($A_{EO}$) and the total area of two L-lactide block peaks ($X_L$) were recorded. The final block composition was then calculated basing on the molecular formula $X_n EO_p X_n$ where $p \in \{23, 46, 91\}$, and using $p:A_{EO}=2n:X_L$.

Table 5 compares the composition calculated from the measurements with those theoretical and reports the actual L/EO molecular ratio which can be calculated from the composition by $^1$H-NMR: full synthesis of copolymers with higher lactide amounts was more difficult, leading to lower L/EO molecular ratios than those theoretical.

Figure 12:
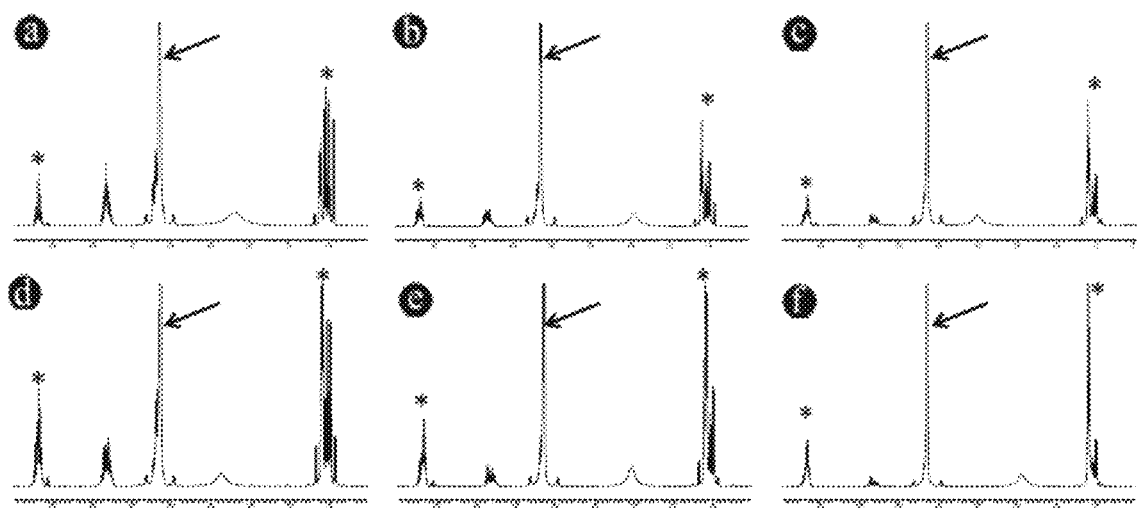
FIG. 12 shows 1H-NMR spectra's of polylactide-poly (ethylene glycol)-based block copolymers.

FIG. 12 depicts NMR-spectra-1 which include $^1$H-NMR spectra's for the poly(ethylene glycol)-based block copolymers (LEOL). (a) LL, (b) ML, (c) HL, (d) LH, (e) MH and (f) HH. Indicated by arrow is the band for EO block ($\delta_{EO}$=3.55-3.80 ppm), while stars indicate the L-lactide block chemical shifts ($\delta_{L1}$=5.10-530 ppm, $\delta_{L2}$=1.40-170 ppm).

TABLE 5

Composition of poly(ethylene glycol)-based block copolymers (LEOL). Copolymer ID

| | Theoretical composition | Composition by $^1$H-NMR | Actual L/EO mol. ratio |
|---|---|---|---|
| LL | $L_{2.5}EO_{23}L_{2.5}$ | $L_{2.3}EO_{23}L_{2.3}$ | 0.20 |
| ML | $L_5EO_{46}L_5$ | $L_{4.3}EO_{46}L_{4.3}$ | 0.19 |
| HL | $L_{10}EO_{91}L_{10}$ | $L_{8.1}EO_{91}L_{8.1}$ | 0.18 |
| HM | $L_{15}EO_{91}L_{15}$ | n/a | n/a |
| LH | $L_5EO_{23}L_5$ | $L_{4.5}EO_{23}L_{4.5}$ | 0.39 |
| MH | $L_{10}EO_{46}L_{10}$ | $L_{9.1}EO_{46}L_{9.1}$ | 0.39 |
| HH | $L_{20}EO_{91}L_{20}$ | $L_{16.3}EO_{91}L_{16.3}$ | 0.36 |

Wherein the actual L/EO molar ratio is the actual ratio as determined by $^1$H NMR described herein above for the lactic acid monomers over the ethylene oxide monomers.

1.3. Preparation of Blends of Poly(Ethylene Glycol)-Based Block Copolymers (LEOL)

Each block copolymer was mixed with another one in the desired proportions via syringe. Table 6 shows the blends prepared, including the calculated L/EO mol. ratio based on those obtained from $^1$H-NMR data (Table 5). Please note that in a blend one cannot strictly speak of a L/EO molecular ratio, but it can be used as an indicator for the L-lactic acid amount in the final blend.

TABLE 6

Prepared blends of poly(ethylene glycol)-based block copolymers (LEOL).

| Composition [% v/v] | Observations | Theoretical L/EO mol. ratio |
|---|---|---|
| 25LL75ML | Malleable | 0.19 |
| 50LL50ML | | 0.19 |
| 25LL75HL | | 0.18 |
| 50LL50HL | | 0.18 |
| 25ML75HL | | 0.18 |
| 50ML50HL | | 0.18 |
| 50ML50HM | Malleable | n/a (theoretical: 0.25) |
| 25LH75MH | Hard | 0.39 |
| 50LH50MH | | 0.39 |
| 25LH75HH | | 0.36 |
| 50LH50HH | | 0.36 |
| 25MH75HH | | 0.36 |
| 50MH50HH | | 0.37 |

Longer EO blocks seem to result in harder to another one with shorter EO block, the resulting binder seems to be harder blends. Moreover, blends containing block copolymers with higher L-lactic acid/EO block molecular ratio are very hard. The melting point of resulting blends is not very different than that of the component with longer EO block.

Example 2. Sterilization of Block Copolymers and Blends Thereof

The block copolymers and blends from Example 1 and listed below were sterilized with two different methods: γ-irradiation and e-beam.

Copolymers: LL, ML, HL

Blends: 25LL75HL, 25ML75HL, 50ML50HL

The materials were compared against their non-sterile counterparts on the basis of gross appearance (Table 7).

TABLE 7

Gross observations of block copolymers and blends after sterilization.

| ID | Observations as compared to the non-sterile counterpart |
|---|---|
| LL | γ-irradiation: soft but thick cream (no observable changes). e-beam: soft but thick cream (no observable changes). |
| ML | γ-irradiation: hard mass (no observable changes). e-beam: hard mass (no observable changes). |
| HL | γ-irradiation: waxy mass (no observable changes). e-beam: waxy mass (no observable changes). |
| 25LL75HL | γ-irradiation: hard uniform mass (no observable changes). e-beam: hard uniform mass (no observable changes). |
| 25ML75HL | γ-irradiation: hard uniform mass (no observable changes). e-beam: hard uniform mass (no observable changes). |
| 50ML50HL | γ-irradiation: hard uniform mass (no observable changes). e-beam: hard uniform mass (no observable changes). |

Example 3: In Vitro Bench Testing of Formulation of LEOL Copolymer Binders with Particles into Putty

3.1. Preparation of Putties

Based on positive handling evaluation, a subset of the block copolymer blends from Example 1 was selected as potential putty binders. Various putties were prepared with CaP ceramic granules (size 0.5-1 mm) and one binder in a binder/CaP volume ratio of 0.8. Accordingly, the polymer component was melt and mixed with CaP granules. Only those (non-sterile) putties that could retain granules have been further considered.

3.2. Characterization of Non-Sterile Putties

3.2.1. Blind Test

The blind test was executed by third persons to evaluate the handling performance of the putties, which were scored according to the guidelines as described herein above and in Table 1. The final score (FS) of each material was calculated, where the worst performance was scored with 5 and the best one with 30. The results are summarized in Table 8.

3.2.2. Dissolution Test

Figure 2:
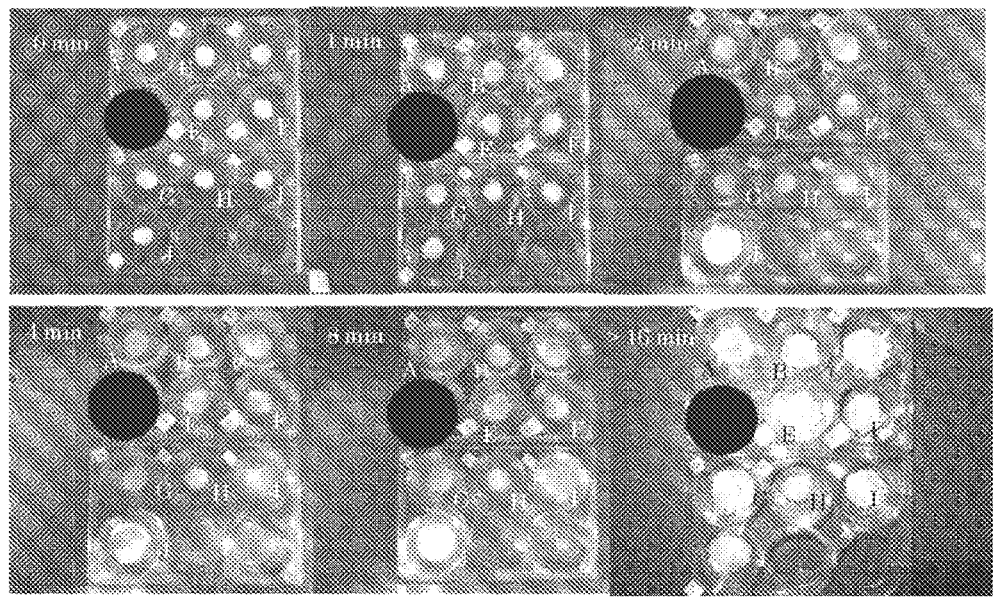

Dissolution test was done by immersing roughly 1 mL of each putty in 11 mL of phosphate buffered solution (i.e. PBS) at 37° C. without shaking. At the time points of 1, 2, 4, 8, 16 and >16 minutes pictures were taken. FIGS. 1 and 2 show images of the dissolution during time, while Table 8 shows the results.

FIG. 1 shows results of dissolution the test for non-sterile samples in PBS.

All non-sterile LEOL-binders had a rapid start of dissolution (viz. within 30-60 minutes) and let the corresponding putties release granules. However, they had different dissolution rates as bulky bodies in the putties containing 25ML75HL, 50ML50HL, 25LL75HL, 50LL50HL, 50LH50HH and 25LH75MH were present after 32 min (see FIG. 2).

FIG. 2 shows more results of the dissolution test for non-sterile samples in PBS. Legend labels of materials: (A) 25ML75HL; (B) 50ML50HL; (C) 50LL50ML; (E) 25LL75ML; (F) 25LL75HL; (G) 50LL50HL; (H) 50LH50HH; (I) 25LH75MH; (J) 50LH50MH.

TABLE 8

Selected putties and results from the blind and dissolution tests.

| Composition binder/CaP vol ratio = 0.8 | Blind test | Dissolution test [min] |
|---|---|---|
| 100LL CaP granules | n/a | starts at 8 min, almost completely dissolved at >16 min |
| 100HL CaP granules | n/a | starts at 16 min, almost completely dissolved at >32 min |
| 25LL75ML CaP granules | 21.4 | starts at 16 min, partially dissolved at >32 min |
| 50LL50ML CaP granules | 20 | starts at 1 min, partially dissolved at >16 min |
| 25LL75HL CaP granules | 24 | starts at 16 min, almost completely dissolved at >16 min |
| 50LL50HL CaP granules | 22 | starts at 16 min, almost completely dissolved at >16 min |
| 25ML75HL CaP granules | 23.6 | partially dissolved at >16 min |
| 50ML50HL CaP granules | 20.8 | partially dissolved at >16 min |
| 25LH75MH CaP granules | n/a (loss of granules) | starts at 2 min, almost completely dissolved at >16 min |
| 50LH50MH CaP granules | n/a (loss of granules) | starts at 2 min, almost completely dissolved at >16 min |
| 50LH50HH CaP granules | 22.2 | the least dissolved at >16 min |

Example 4: Copolymer Synthesis with Central Block Different than PEG

Two families of L-lactide containing copolymers were prepared, differing in the type of their central block: one with poly(propylene glycol) (i.e. LPGL) and the other with Pluronic® (LPUL). The central block could be with different molecular weight or different kinds of Pluronic®. When the same central block was considered, different lactic acid/central block molar ratios were also considered.

4.1. Synthesis

All block copolymers were synthesized via ring-open polymerization of L-lactide monomer in presence of poly (propylene oxide) or Pluronic® P65 as initiators and stannous octoate (i.e. $SnOct_2$) as catalyst. All reactions were performed under an argon saturated atmosphere at 130° C. and stirring rate of 50 rpm for 24 hours. Table 9 shows the synthesized block copolymers.

TABLE 9

LPGL and PLUL block copolymers.

| Family | Copolymer ID | Design Property | Theoretical L/PG mol. ratio |
|---|---|---|---|
| LPGL poly(propylene glycol) based | $PG4_L$ | $L_{7.5}PG_{68}L_{7.5}$ | 0.22 |
| | $PG4_M$ | $L_{15}PG_{68}L_{15}$ | 0.44 |
| | $PG4_H$ | $L_{22.5}PG_{68}L_{22.5}$ | 0.66 |
| LPUL Pluronic® based | $P65_L$ | $L_{11}P65L_{11}$ | 0.57 |
| | $P65_M$ | $L_{16.5}P65L_{16.5}$ | 0.86 |
| | $P65_H$ | $L_{22}P65L_{22}$ | 1.15 |
| | $F127_{LL}$ | $L_{11}F127L_{11}$ | 0.11 |
| | $F127_M$ | $L_{87}F127L_{87}$ | 0.87 |

Wherein the theoretical L/PG molar ratio is the theoretical ratio as described herein above for the lactic acid monomers over the ethylene oxide and propylene oxide monomers.

4.2. Characterization of Copolymers

4.2.1. Physical (Gross) Appearance of LPGL and LPUL Copolymers

The copolymers were observed with stereomicroscope to detect any presence of any undesired inhomogeneity. Afterwards they have been characterized regarding their hardness via pressing with steel tools first and with hands then. Table 10 summarizes the observations on LPGL copolymers and Table 11 refers to LPUL copolymers.

TABLE 10

Physical observations (handling) on poly(propylene glycole)-based block copolymers (LPGL).

| ID | Notes |
|---|---|
| PG4$_L$ | At room temperature, viscous fluid tending to white color. |
| PG4$_M$ | Viscous and white semi-solid that quickly solidifies as soon as temperature drops from 130° C. |
| PG4$_H$ | White and thick fluid that quickly solidifies as soon as temperature drops from 130° C. |

Basing on the gross observations, it may be said that the material hardens with the increase in L-lactide block size (e.g. PG4$_L$ vs. PG4$_M$ vs. PG4$_H$).

TABLE 11

Physical observations (handling) on Pluronic ®-based block copolymers (LPUL).

| ID | Notes |
|---|---|
| P65$_L$ | At room temperature is liquid. |
| P65$_M$ | At room temperature is liquid. |
| P65$_H$ | Soft mass |
| F127$_{LL}$ | Hard brownish solid mass. |
| F127$_M$ | Hard brownish solid mass. |

4.2.2. Dissolution Test of LPGL Copolymers

Carefully weighed masses (m$_0$) of PG4$_M$ and PG4$_H$ block copolymers were placed in 100 mL of distilled water, for one week at 37±1° C. and gently shaken. Three time points were considered (i.e. 1, 4 and 7 days; 1 replicate per time point), when the samples were harvested, excess water wiped away and their wet weight (mw) was measured. Then, each sample was photographed and then vacuum dried at 37±1° C. until stabilization of their weights. Therefore the dry weights (md) were taken. Fluid uptake (FU) and mass loss (ML) changes (in %) could be calculated, for each sample at each time point, as $$FU = 100 * (m_w - m_d)/m_d$$

$$ML = 100 * (m_0 - m_d)/m_d$$

Figure 3:
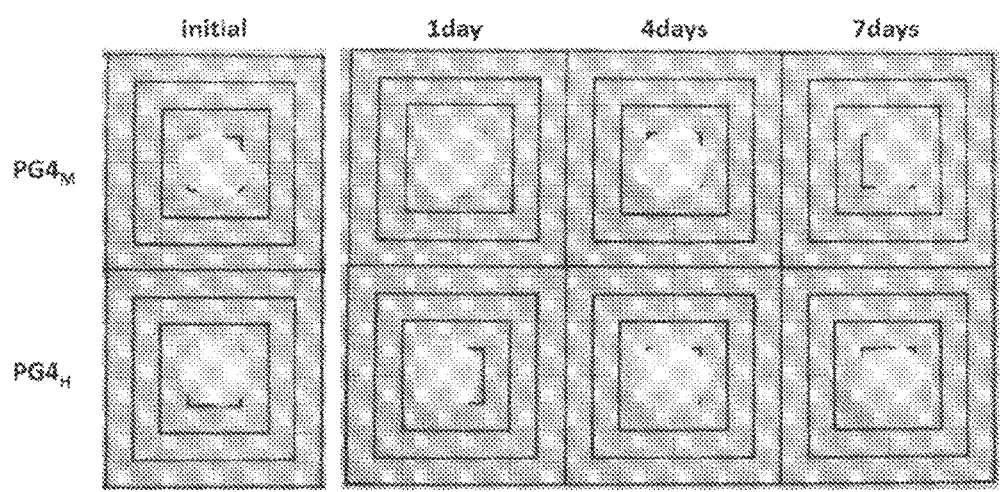
FIG. 3 shows images of dimensional change of block copolymer blends over time as carried out in Example 4.

The dimensional change is determined by the variation of average diameter (in %) during time, where the average diameter is given by the average of diameters measured along different directions. Table 12 show the results for fluid uptake, mass loss and average dimension changes (FIG. 3).

TABLE 12

One-week degradation of poly(propylene glycol)-based block copolymers (LPGL).

| | Mass Loss [%] | | | Fluid Uptake [%] | | | Dimension Change [%] | | |
|---|---|---|---|---|---|---|---|---|---|
| Copolymer | 1 day | 4 days | 7 days | 1 day | 4 days | 7 days | 1 day | 4 days | 7 days |
| PG4M | 1.6 | 1.5 | 2.6 | 4.9 | 3.5 | 3.0 | 17.1 | 7.5 | 2.6 |
| PG4H | 7.6 | 8.5 | 8.4 | 6.6 | 9.0 | 9.7 | 10.3 | 17.2 | 11.1 |

LPGL copolymers seem to change during time when in contact with PBS but they retain their bulky mass.

4.3. Preparation of LPGL- and LPUL-Based Putties and Dissolution Properties

Figure 4:
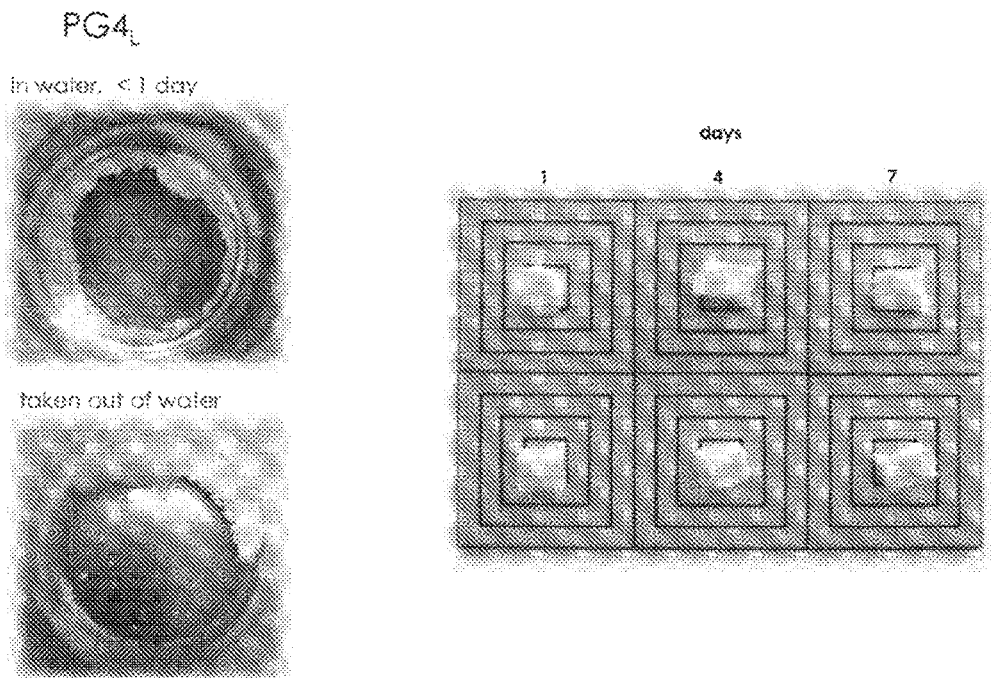
FIG. 4 shows a images of composition forming a polymer ball and quickly releases granules as carried out in Example 4.

Putties were prepared with CaP ceramic granules (size 0.5-1 mm) and one binder in a binder/CaP volume ratio of 0.8. Each putty underwent a dissolution test (see Example 3.2.2 for procedure): Table 13 and FIG. 4 show the results regarding LPGL-based putties.

TABLE 13

Physical observations (handling) on poly(propylene glycol)-based copolymer (LPGL) putties.

| ID | Handling property | Dissolution |
|---|---|---|
| putty PG4L | Loses granules, not malleable. | Granules were released, but polymer is not dissolved. |
| putty PG4M | Very good handling. | Putty retains shape and size over a week |
| putty PG4H | Good handling characteristics. | Putty retains shape and size over a week |

FIG. 4 shows that the PG4$_L$-based putty quickly releases granules and forms a small polymer ball. As soon as the degrading medium was removed, the polymer ball lost shape. In contrast, PG4$_M$- and PG4$_H$-based putties kept the shape for the whole duration of the experiment (i.e. one week).

All LPUL-based putties were dissolvable in water and could release the ceramic granules (Table 14). It may be seen that those binders having less polylactide had a higher dissolution rate.

TABLE 14

Handling and dissolution properties of Pluronic ®-based block copolymer (LPUL) putties.

| ID | Handling property | Dissolution |
|---|---|---|
| putty P65$_L$ | Loses granules, not malleable. | Dissolved in 5 minutes, with granules release. |
| putty P65$_M$ | Good handling. | Dissolved in 1.5-2 hours, with granule release. |

TABLE 14-continued

Handling and dissolution properties of Pluronic ®-based block copolymer (LPUL) putties.

| ID | Handling property | Dissolution |
|---|---|---|
| putty P65$_H$ | Brittle putty. | Partially dissolved over 4 days. |

Example 5: Sterilization Putties

5.1 Sterilization of LEOL Putties

Figure 5:
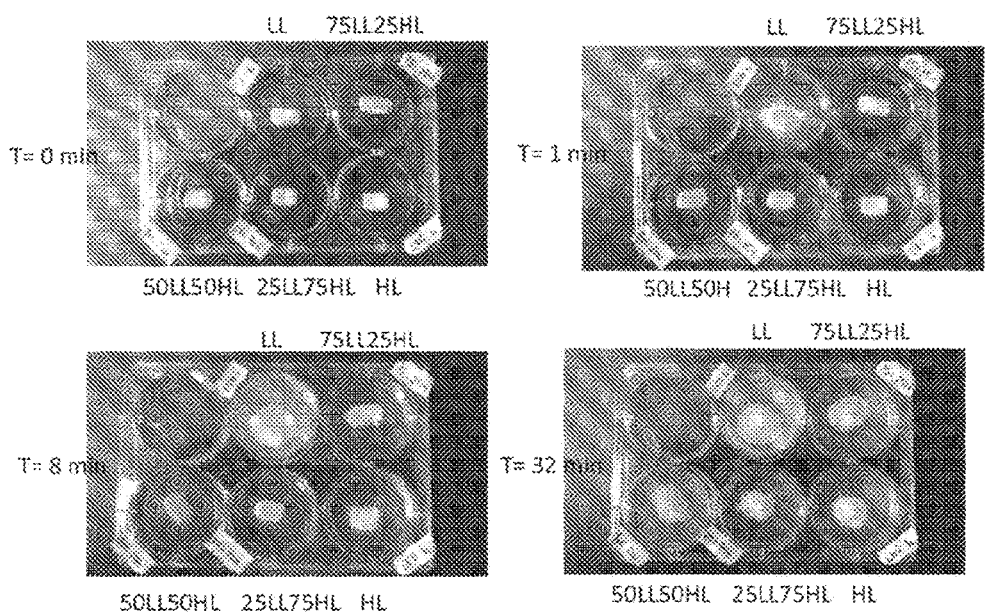
FIG. 5 illustrates the dissolution behavior of the various composition over time from an experiment as carried out in Example 4.

Certain LEOL putties from Example 3.1 were sterilized with γ-irradiation (25-40 kGy) and evaluated on their capacity to retain granules and be shaped. A subgroup was then selected basing on the handling results and subjected to dissolution test. FIG. 5 illustrates the dissolution behavior of the selected putties, which seems similar to those not-sterile (FIG. 1).

From the figures at time T=0 min, one can see which putties were still able to retain granules and be shaped after sterilization (i.e. putties with LL, 75LL25HL, 50LL50HL, 25LL75HL and HL).

Figure 6:
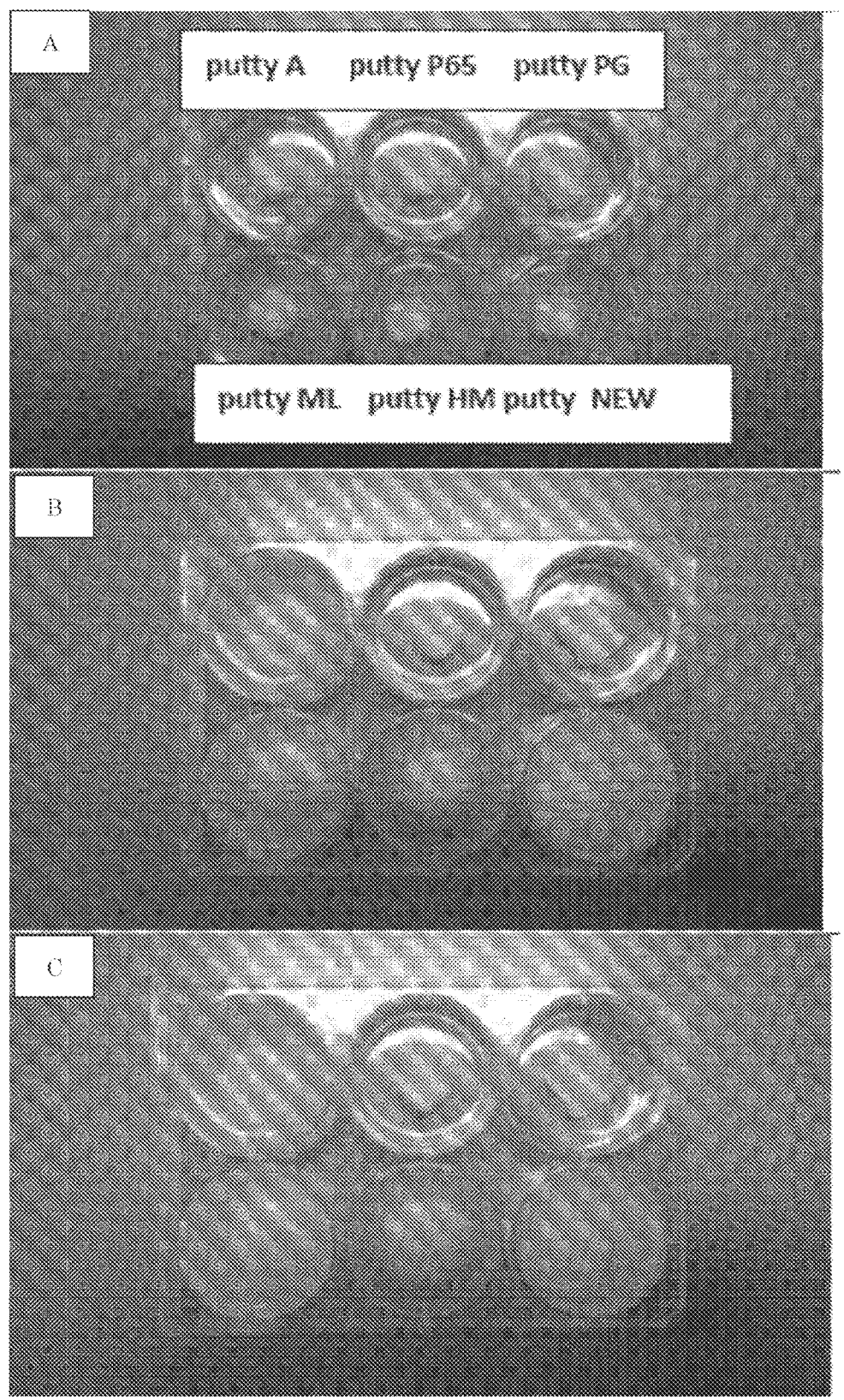
FIG. 6 A-C show dissolution rate in PBS at 37° C. of block copolymer blends over time as carried out in Example 4.

Certain other putties from Example 3.1 were sterilized with γ-irradiation and compared against their non-sterile counterparts on the basis of gross shapeabling properties (Table 15), while their dissolution rate in PBS at 37° C. was evaluated as well (FIG. 6).

Certain putties (e.g. putty ML) showed even slightly improved handling characteristics after sterilization.

FIG. 6A shows the initial shape and size of sterile putties. All have retained the granules after sterilization and kept the shape. However, as reported in table 15, they had different handling properties. FIG. 6B shows the putties after 32 minutes in PBS. Those putties with binders based on PEG started to disintegrate indicating a rapid triggering of binder dissolution. FIG. 6C shows the composite materials after one hour: all PEG-based putties released most of granules (observe the central block still standing: it will disappear during the next hour). Pluronic- and poly(propylene glycol)-based putties were not disintegrated at all and did not release any granule after one hour. They will still keep the same shape after two days.

TABLE 15

Handling of certain putties after γ-irradiation.

| ID of putties (CaP/binder v/v ratio = 1.2-1.3) binder formulation | Observations as compared to the non-sterile counterpart |
|---|---|
| putty A (25ML75HL) | Non-sterile: consistent mass, looks hard but it is shapeable<br>After γ-irradiation: softer, with good shapeability and not sticky |
| putty ML (100ML) | Non-sterile: shapeable, softer than putty A<br>After γ-irradiation: good shapeability (even if a bit hard at the beginning) and not sticky |
| putty HM (100HM) | Non-sterile: hard and there is need to work it with hands before getting it shapeable<br>After γ-irradiation: too hard |
| putty NEW (50ML50HM) | Non-sterile: consistent mass, looks hard but it is shapeable<br>After γ-irradiation: harder but still shapeable |

5.2 Sterilization of LPGL-Based Putties

Two preferred LPGL-based putties from Example 4 were sterilized with γ-irradiation (25-40 kGy). Table 16 shows the observations.

TABLE 16

Handling of poly(propylene glycol)-based copolymer (LPGL) putties after sterilization.

| ID | Handling property after sterilization |
|---|---|
| putty PG4$_M$ | Non-sterile: excellent shaping properties☐<br>After γ-irradiation: good shapeability, but a bit sticky. Retained granules and kept the shape, same handling properties were observed. |
| putty PG4$_H$ | Retained granules and kept the shape, same handling properties were observed. |
| putty P65$_M$ | Non-sterile: soft mass and sticky<br>After γ-irradiation: too soft, with loss of granules |

Example 6 In Vivo Biological Performances of Selected LEOL Putties in Osteoinduction Model Four LEOL putties from Example 3.1 (Table 17) were implanted in back muscle of five dogs for 8 weeks to evaluate the effect of four different LEOL binders on the osteoinduction potential of calcium phosphate ceramic granules (size 0.5-1 mm). After harvesting and histoprocessing, they have been stained with methylene blue/basic fuchsin and sectioned.

TABLE 17

The LEOL-based putties implanted.

| Material description | Notes |
|---|---|
| A putty | 25ML75HL binder with CaP granules (0.5-1 mm) in polymer/CaP volume ratio of 0.8 |
| B putty | 50ML50HL binder with CaP granules (0.5-1 mm) in polymer/CaP volume ratio of 0.8 |
| F putty | 25LL75HL binder with CaP granules (0.5-1 mm) in polymer/CaP volume ratio of 0.8 |
| MH putty | 100MH binder with CaP granules (0.5-1 mm) in polymer/CaP volume ratio of 0.8 |

Not much difference was seen among the four composite materials, and histological observations are comparable with each other.

For all composite materials bone formation was observed, mainly scattered in spots over the whole implant area. Osteoid, with a seam of osteoblast cells lining its border surface, was present indicating active bone formation. CaP ceramic debris was occasionally observed as dispersed in soft tissue matrix in the form of small particles (dimensions in the order of tens of microns). Many multinucleated giant cells, with CaP ceramic nano-particles phagocytized, were present on the surface of ceramic granules. When no bone was observed (i.e. one B, one F and one MH), very limited amount of cells were seen and soft tissue looked like fibrous. No inflammatory signs were observed in any explant and no fibrotic capsule was formed.

Visually comparing the putty samples, not much difference was observed indicating that all four gels performed similarly. When the putties were compared to CaP ceramics alone, it appeared that bit less bone formation occurred indicating a possible slight bone-hindering effect of the gels.

However, osteoid and osteoblast cells indicate that, after 8 weeks implantation, bone formation is still ongoing and may lead to a larger bone volume at later stages. The presence of multinucleated giant cells and of ceramic residuals dispersed in the soft tissue matrix, and the simultaneous absence of any inflammation signs, indicate cell-driven resorption of the ceramic granules is active.

Figure 7:
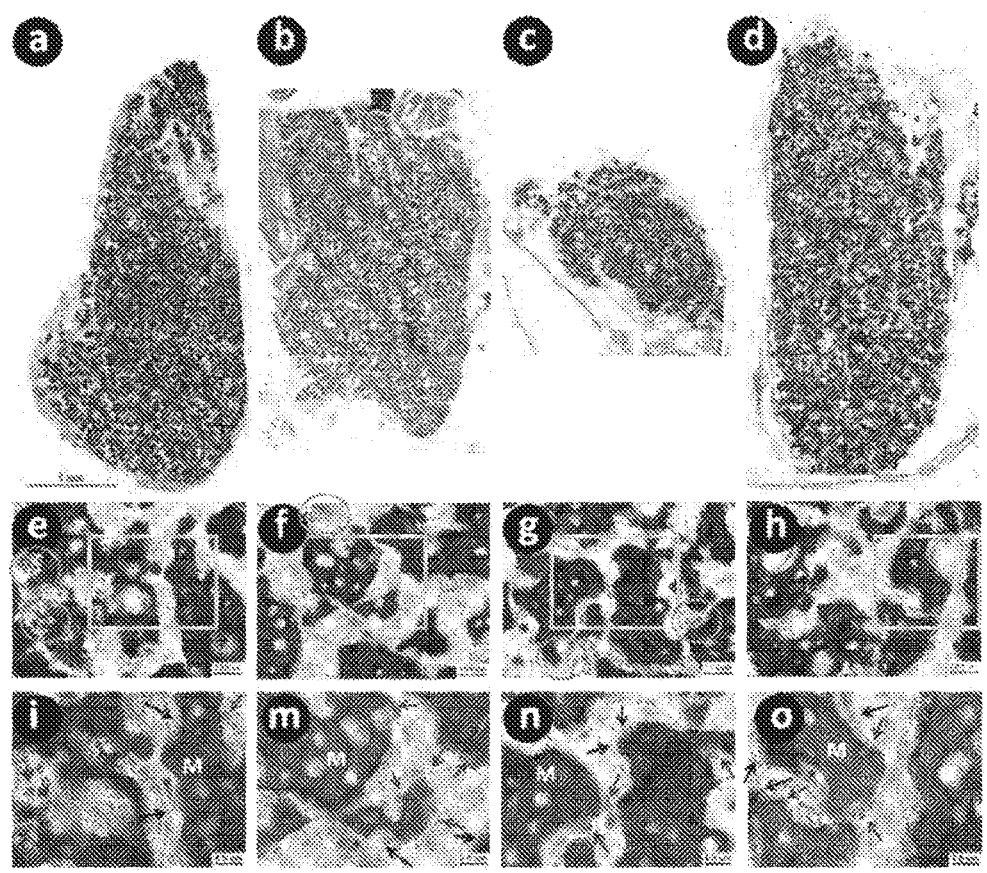
FIG. 7 shows a detailed microscope pictures for composite materials and histological analysis from dog 2 obtained in Example 6.

FIG. 7 shows a detailed microscope pictures for each composite material and histological analysis from dog 2. In (a) is the overview of putty A, (b) is overview of putty B, (c) is overview of putty F, and (d) is overview of putty MH. The scale bar in (a) applies for all overviews. Detailed images taken at higher magnification (×10) are shown in (e) for putty A, (f) for putty B, (g) for putty F and (h) for putty MH. Circles in (e), (f), (g) and (h) in indicate ceramic debris dispersed in soft tissue matrix. The boxes in (e), (f), (g) and (h) indicate where images with further higher magnification (×20) were taken: (i) is putty A, (m) is putty B, (n) is putty F and (o) is putty MH. Letter M stands for material (i.e. CaP ceramic granules), black stars indicate osteoid, black arrows show the seam of osteoblast cells and gray arrows show multinucleated giant cells phagocytizing on the surface of the granules.

Example 7. Selection of a Suitable Binder Formulation

In this example, additional blends of L-lactide/EO block copolymers were prepared and analyzed. The synthesis of the copolymers and the blends was carried out analogously to Example 1.1. The following blends of copolymers were prepared.

TABLE 18

Blends of copolymers

| ID | Formulation | Actual L/EO mol. ratio |
|---|---|---|
| Blend A | 26.4% wt. L-lactide + 18.4% wt. PEG2000 + 55.2% wt. PEG4000 | 0.18 |
| Blend C | 15% wt. L-lactide + 21.25% wt. PEG1000 + 63.75% wt. PEG2000 | 0.10 |
| Blend W | 15% wt. L-lactide + 23.4% wt. PEG1000 + 59.5% wt. PEG2000 + 2.1% wt. PEG3000 | 0.11 |
| Blend Z | 25% wt. L-lactide + 37.5% wt PLU85 + 37.5% wt PEG4000 | <0.05 |

Wherein the actual L/EO molar ratio is the actual ratio as determined by 1H NMR described herein above for the lactic acid monomers over the ethylene oxide monomers.

7.1. Characterization of the Blends

The melt point was determined as described in Example 1 (1.2.2.), and the intrinsic viscosity was measured with Ubbelohde viscometer (25° C., 0.33 g/dL.). Physical observations were conducted as described in previous examples.

The results of the blend characterization are reported in Table 19

TABLE 19

Characterization of the blends

| ID | Melt range [° C.] | Intrinsic viscosity [dL/g] | Observations |
|---|---|---|---|
| Blend A | 41-43 | 0.16 | hard-to-semi hard waxy mass |
| Blend C | 49-52 | 0.10 | soft waxy mass |
| Blend W | 49-51 | 0.13 | soft waxy mass |
| Blend Z | 45-47 | 0.18 | sticky moldable creamy mass |

7.2. Suitability of the Blends for Putty

Putties were prepared by mixing the different copolymers with calcium phosphate ceramic granules (1-2 mm) as described in example 3.1. A blind handling test in dry air was conducted on the resulting putties:

Blend A: hard putty, which needs to be warmed up in hands for some minutes to get softness and be shapeable;

Blend C: malleable putty, without need to be warmed;

Blend W: malleable putty, very similar to the one prepared with Blend C;

Blend Z: weak material, that breaks down easily as soon as shaped.

The malleability of the four putties has been evaluated also in wet conditions, i.e. they were shaped in water: Blend A and Blend Z disrupted quickly losing their malleability and could not retain ceramic granules. Conversely, Blend C and Blend W retained ceramic granules while being shaped, and could be shaped for a longer time.

Figure 8:
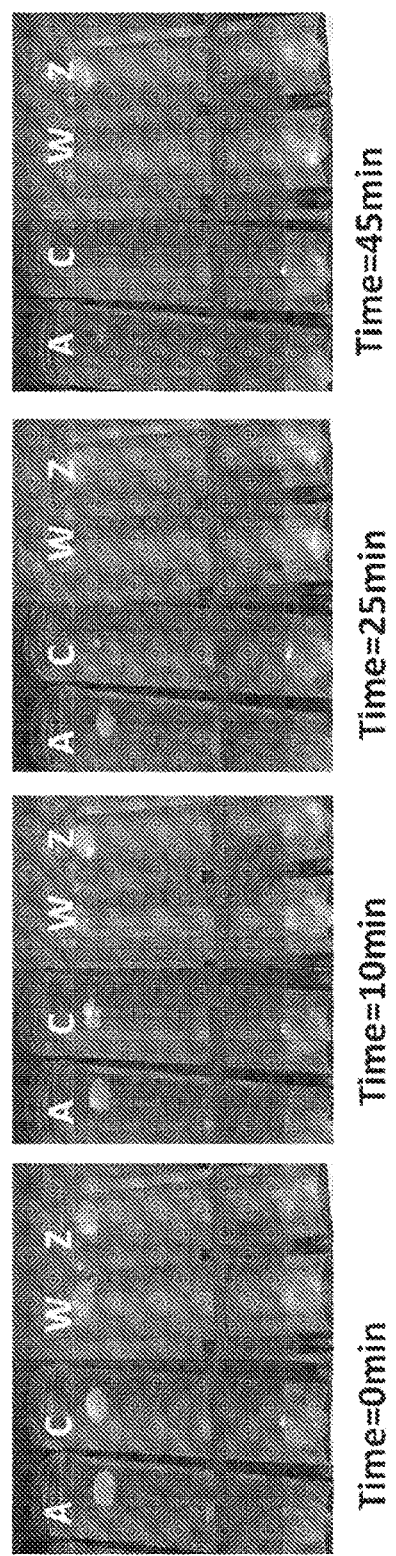
FIG. 8 shows main endpoints of a dissolution test as carried out in Example 7.

The putties have also been evaluated in a dissolution test over a time period. The putties were cut into discs and placed on one extreme of a glass slide. These slides were then placed in tubes filled with 50 mL PBS, which were kept 45° inclined at 37° C. FIG. 8 shows the main endpoints of the dissolution test of the putties. All putties dissolved in an acceptable manner. Blend C and Blend W had faster dissolution leading to quicker putty disruption as compared to Blend A (PEGs with higher molecular weight) and Blend Z (presence of Pluronic P85, which presents hydrophobic poly(propylene glycol) in its structure).

Example 8—Effect of L/EO Ratio (i.e. Role of Lactide Content in the Formulation)

Figure 9:
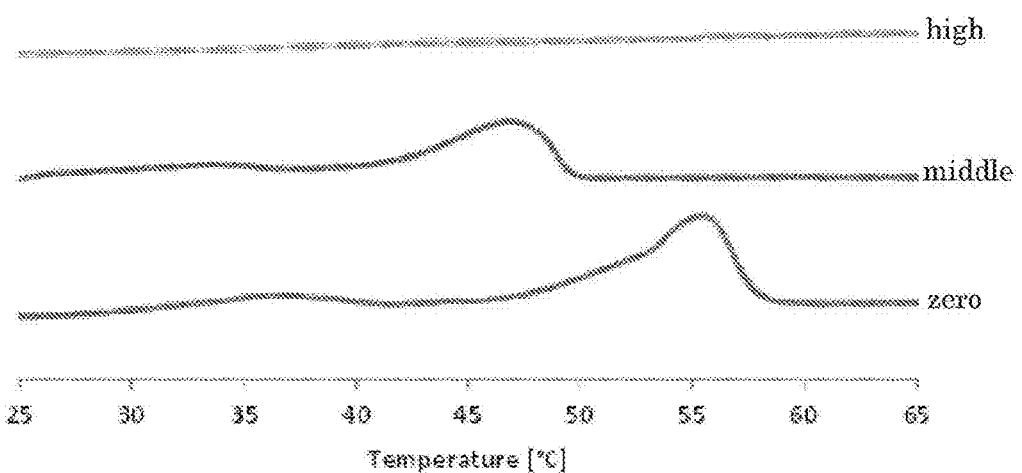
FIGS. 9 and 10 show DSC curves and for physical appearance of three co-polymer formulations obtained in Example 8.
Figure 10:
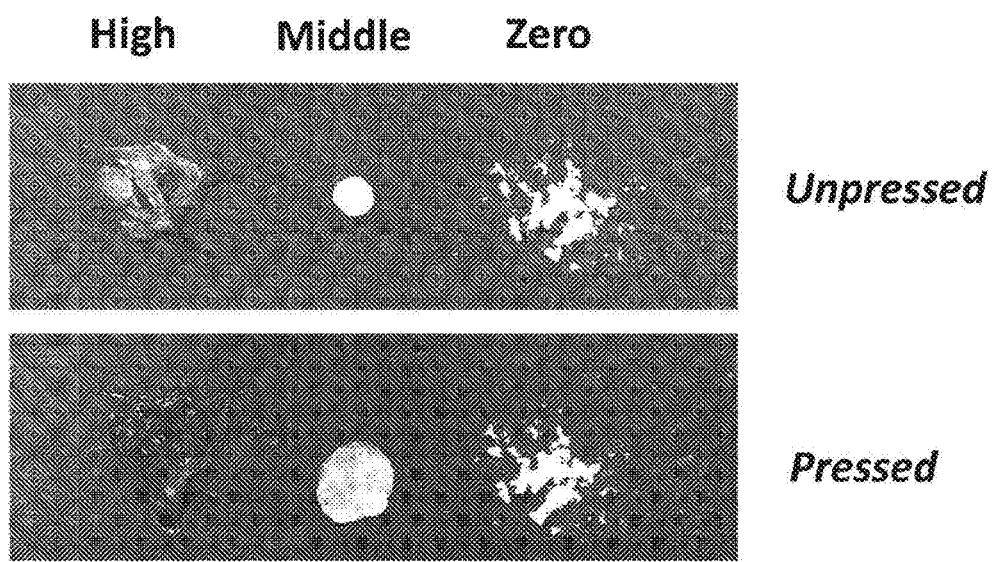

The effect of L/EO ratio on the copolymer physical properties was evaluated. Three formulations, based on Blend C, were prepared with different lactide content as summarized in Table 20. The melt temperature of the three materials has been determined with differential scanning calorimetry (DSC) in the range 25-65° C. with a temperature increase rate of 10° C./min. The results are shown in Table 20 and FIG. 9, the latter showing DSC curves for the three formulations: the decrease of melt temperature with the increase of lactide content is clearly visible. FIG. 10 shows the physical appearance of the formulations according to the lactide content.

TABLE 20

Characterization of the blends prepared
with different lactide content

| ID | Formulation | Actual L/EO mol ratio | Melt temp. [° C.] | Observations (see also FIG. 10) |
|---|---|---|---|---|
| High | 70% wt. L-lactide + 7.5% wt. PEG1000 + 22.5% wt. PEG2000 | 0.93 | n/a | liquid to semi-liquid mass. When shaped, it spreads on the surface |
| Middle | 15% wt. L-lactide + 21.25% wt. PEG1000 + 63.75% wt. PEG2000 | 0.10 | 47.1 | soft waxy mass that, when shaped, keeps the consistency and can be recovered |
| Zero | 25% wt PEG1000 + 75% wt PEG2000 | 0 | 55.4 | brittle mass, no shaping is possible |

Varying the content of lactide resulted in blends with different physical characteristics. This example demonstrates the relationship between the actual ratio L/EO (i.e. the ratio lactic acid units (hydrophobic block) over ethylene oxide units (hydrophilic block)), the melting point (Tm), the PEG length and the hardness of the putty, as depicted in FIG. 11.

The invention claimed is:

1. An anhydrous biocompatible composite putty material for bone regeneration, which is injectable or malleable into a desired shape which is retained comprising a biodegradable polymeric material and a granular synthetic material which granular synthetic material is osteoconductive and/or osteoinductive, wherein the polymeric material consists essentially of at least one block copolymer, wherein said at least one block copolymer is a polymer of formula (I)

$$X_n\text{-}B_q\text{-}A_p\text{-}B_q\text{-}X_m\text{-}[B_qA_pB_q]_l \quad (I)$$

wherein;
A and B are independently polymers of methylene oxide, ethylene oxide, propylene oxide, butylene oxide, dioxanone or phenyl oxide;
X is a polyamide, polyester, polyurethane, polycarbonate or polyester unit;
l is 0 or 1;
m is 1 to 7;
n is 0 or equal to m;
p is 2 to 150;
q is 0 to 100; and
l+n is more than 0;
wherein said biodegradable polymeric material almost completely degrades under physiological conditions within 48 hours.

2. The anhydrous biocompatible composite material of claim 1, wherein l is 0 and n is m.

3. The anhydrous biocompatible composite material of claim 1, wherein m is 2 to 7, and/or p is 6 to 100, and/or q is 0 to 50.

4. The anhydrous biocompatible composite material of claim 1, wherein the granular synthetic material comprises calcium phosphate.

5. The anhydrous biocompatible composite material of claim 1, wherein the actual ratio (n+m) to (p+q), as determined by $^1_H$ NMR, is less than 0.36.

6. The anhydrous biocompatible composite material of claim 1, wherein m is n; l and q are 0.

7. The anhydrous biocompatible composite material of claim 1, that retains its desired shape at a temperature of 15 to 40° C.

8. The anhydrous biocompatible composite material of claim 7, that has been sterilized by γ-rays or electron beams.

9. A method to treat connective tissue and/or bone loss or defect which method comprises administering to a subject in need of such treatment the anhydrous biocompatible composite material of claim 1.

10. A method to sterilize an anhydrous biocompatible composite putty material of claim 1, which method comprises irradiating the anhydrous biocompatible composite putty material by γ-rays or electron beams.

11. A method to treat bone loss or defect, which method comprises shaping the anhydrous biocompatible composite material of claim 1 into a desired shape and placing said shaped material at the site of bone loss or defect.

12. The anhydrous biocompatible composite material of claim 1, wherein A and B are polymers of ethylene oxide or propylene oxide.

13. The anhydrous biocompatible composite material of claim 1, wherein X is a polyester unit.

14. The anhydrous biocompatible composite material of claim 13, wherein X is a polyester formed from hydroxybutyric acid, lactic acid, glycolic acid, γ-butyrolactone, δ-valerolactone or ε-caprolactone.

15. The anhydrous biocompatible composite material of claim 14, wherein X is a polyester formed from lactic acid.

16. The anhydrous biocompatible composite material of claim 3, wherein p is 40 to 50.

17. The anhydrous biocompatible composite material of claim 3, wherein q is 0 to 19.

18. The anhydrous biocompatible composite material of claim 5, wherein the ratio (n+m) to (p+q), as determined by $^1$H NMR, is less than 0.30.

19. The anhydrous biocompatible composite material of claim 18, wherein the ratio (n+m) to (p+q), as determined by $^1$H NMR, is between 0.01 and 0.25.

20. The anhydrous biocompatible composite material of claim 19, wherein the ratio (n+m) to (p+q), as determined by $^1$H NMR, is between 0.05 and 0.15.

21. The anhydrous biocompatible composite material of claim 5, wherein the ratio (n+m) to (p+q), as determined by $^1$H NMR, is less than 0.10.

22. A method to engineer tissue to correct a connective tissue and/or bone defect which method comprises providing anhydrous biocompatible composite material of claim 1 to the defect.

23. The anhydrous biocompatible composite putty material of claim 1 wherein p is 2 to 50 and q is 0 to 50.

* * * * *